April 1, 1969     G. F. HINTON     3,436,650
SPINNING LINE INTEGRAL MAGNETOMETER FOR MEASURING
A CURRENT OR AN ELECTRIC FIELD
Filed Sept. 30, 1965

INVENTOR
GEORGE F. HINTON

BY

ATTORNEY

United States Patent Office 3,436,650
Patented Apr. 1, 1969

3,436,650
SPINNING LINE INTEGRAL MAGNETOMETER FOR MEASURING A CURRENT OR AN ELECTRIC FIELD
George F. Hinton, Severna Park, Md., assignor to the United States of America as represented by the Secretary of the Navy
Filed Sept. 30, 1965, Ser. No. 491,843
Int. Cl. G01r 33/02
U.S. Cl. 324—43           11 Claims

ABSTRACT OF THE DISCLOSURE

An instrument for measuring small electric currents in electrolytes, measuring ambient electric fields, and for detecting a non-potential term in the earth's magnetic field. The device includes a toroid of magnetically permeable material having a sensing coil wound thereon and means for rotating the toroid and coil assembly at a fixed angular rate. The device may include an elongated electrically conductive core received concentrically within the toroid for rotation therewith.

---

Figure 1:
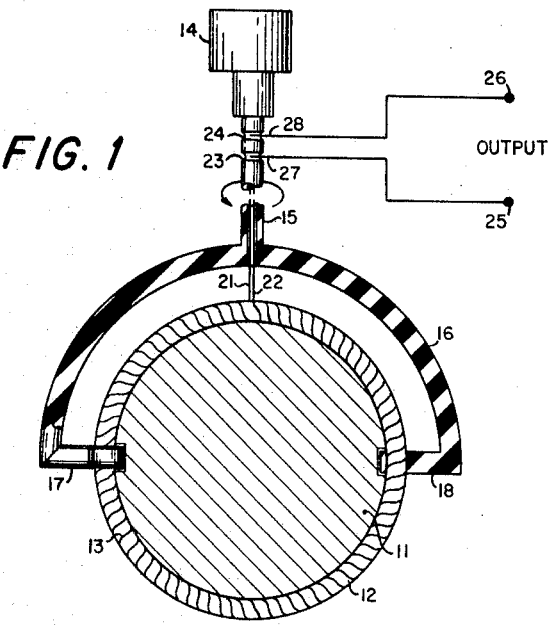

The invention described herein may be manufactured and used by or for the Government of the United States of America for governmental purposes without the payment of any royalties thereon or therefor.

The present invention relates to an apparatus for and method of measuring currents and electric fields and of detecting any non-potential term in the earth's magnetic field and, more particularly, to a method of and apparatus for measuring the density, direction, and frequency of current flow through an electrolyte, the amplitude of ambient electric fields, and of conducting study into the existence of a non-potential term in the earth's magnetic field.

One of the important applications of the present invention is in the measurement of currents, particularly, in the measurement of the density, direction and frequency of small currents flowing through an electrolyte. Recently, much attention has been focused on the measurement of the natural telluric currents in sea water. The conventional prior art method of measuring such currents has been to immerse a pair of spaced electrodes in the water and to measure the potential difference between them. This method is not altogether satisfactory because the electrodes must be connected by long cables and the measured potential difference contains errors due to the electrodes themselves and also to the changing character of the environment.

Another area of investigation which is of interest for both civilian and military purposes is the measurement of the earth's electric field and the changes caused therein by various phenomena such as subsurface deposits of conducting ore, weather conditions, and geomagnetic activity. The prior art method of measuring the earth's natural electric field is by use of a "field mill" in which a metal plate alternately shields and uncovers another metal plate by mechanical movement. The main shortcomings in this method are its awkwardness and insensitivity.

Also, it has been recently hypothesized that the earth's magnetic field contains a finite non-potential term. This hypothesis is contrary to the theory of the nature of the earth's magnetic field, which has been accepted until recently. However, the integration of ground magnetic measurements around large areas of the surface of the earth has yielded results which have indicated the existence of line integrals much larger than can be accounted for by observed earth-air electric currents and, hence, the existence of a finite non-potential term in the earth's magnetic field. A discussion of the finite non-potential term in the earth's magnetic field may be found in "Physics of the Earth—VIII—Terrestial Magnetism and Electricity," edited by J. A. Fleming, first edition, 1939, McGraw-Hill Book Company at pages 317–325 and also in "Geomagnetism," Chapman and Bartels, vol. I, Oxford publication, 1st edition, pages 110–113. However, the methods of detecting the existence of this finite non-potential term have not been adequate to conclusively prove or disprove its existence.

The general purpose of the invention is to provide apparatus and methods for measuring the density, direction, and frequency of currents, particularly, low frequency, small currents flowing through an electrolyte and for measuring the amplitude of ambient electric fields and for detecting any finite non-potential term in the earth's magnetic field which apparatus and methods do not suffer from the above described limitations of the prior art in performing the same functions.

In the measurement of current flow and ambient electric fields, the present invention contemplates spinning a highly conductive core encircled by highly permeable toroid with a secondary winding wound thereon in the electrolyte or field. In investigating the existence of a finite non-potential term in the earth's magnetic field, the present invention contemplates the orientation of a highly permeable toroid with a coil wound thereon so that the coil contains a complete circular magnetic field and then spinning the toroid to reverse this field with respect to the coil once for each revolution.

It should be noted that the present invention operates on the same general principle as that disclosed in copending application of George F. Hinton, filed concurrently herewith, and entitled, "Line Integral Magnetometer," Ser No. 491,846. However, it differs structurally and operationally from the aforementioned copending application.

An object of the present invention is the provision of a spinning line integral magnetometer suitable for measuring the density, direction, and frequency of small currents flowing through an electrolyte.

Another object is to provide a method of measuring the density, direction, and frequency of small currents flowing through an electrolyte.

A further object of the invention is the provision of a spinning line integral magnetometer suitable for measuring the amplitude of ambient electric fields.

Still another object is to provide a method of measuring the amplitude of ambient electric fields.

Yet another object of the present invention is the provision of a spinning line integral magnetometer to conduct investigation into the existence of a finite non-potential term in the earth's magnetic field.

A still further object is to provide a method of determining the existence or non-existence of a finite non-potential term in the earth's magnetic field.

Figure 2:
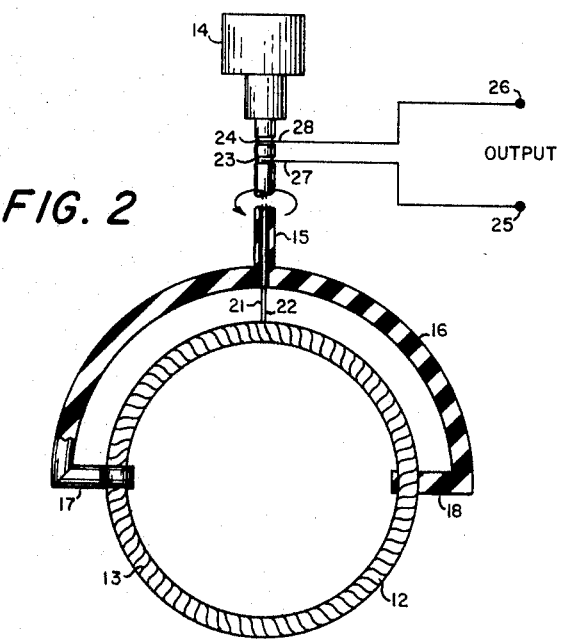

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows, partly in cross-section, an embodiment of the present invention suitable for measuring the density, direction, and frequency of currents flowing through an electrolyte and for measuring the amplitude of ambient electric fields; and FIG. 2 shows, partly in cross-section, a spinning line integral magnetometer suitable for investigating into the existence of a finite non-potential term in the earth's magnetic field.

As used herein the phrase "highly permeable magnetic material" refers to a material having a permeability at least as large as the permeability of the least permeable material classified among the "High Permeability Materials" in the Handbook of Chemistry and Physics, 39th edition, Chemical Rubber Publishing Company, page 2437.

Also, since the present invention employs Ampere's law, which states that the line integral of the magnetic field intensity around a closed path is equal to the current enclosed by that path and, since it is spun, it is referred to as a spinning line integral magnetometer.

Turning now to the details of FIG. 1, a cylindrically shaped core 11, which is composed of a highly electrically conductive material, such as copper, is encircled by a toroid 12 which is composed of a highly permeable magnetic material, preferably a material such as mu-metal or permalloy. A coil 13 is wound on the toroid.

Motor 14 is coupled to hollow shaft 15 which in turn is conected to yoke 16. Yoke 16 is secured to toroid 12 by clamps 17 and 18. The output leads 21 and 22 from coil 13 pass through hollow shaft 15 and are respectively electrically connected in any suitable manner (not shown) to conducting rings 23 and 24. Output terminals 25 and 26 are respectively coupled to conducting rings 23 and 24 by sliding contacts 27 and 28.

As shown, shaft 15, yoke 16, and clamps 17 and 18 are composed of electrically insulating material. However, it should be understood that these members need not be entirely composed of an insulating material; rather, it is only necessary that conducting rings 23 and 24 be insulated from one another and from toroid 12.

When used to measure the density, direction, and frequency of current flowing through an electrolyte, the toroid 12 and encircled core 11 are immersed in the electrolyte. Core 11, being a highly conductive material, enhances the current flow through the center of toroid 12 and this current flow produces a circular magnetic field in which toroid 12 lies and which is enhanced by the highly permeable magnetic material of toroid 12. Winding 13 acts as a secondary winding and the time variations in the magnetic field produced by current flow through core 11 induce a voltage in winding 13 which appears across output terminals 25 and 26.

If toroid 12 and encircled core 11 were held stationary, no voltage would be induced in winding 13 when the current flow through core 11 was a direct current and only low voltages would be induced in winding 13 when the frequency of the current flow through core 11 was low. However, when toroid 12 and enclosed core 11 are spun by rotation of shaft 15, either clockwise or counterclockwise, at a predetermined fixed rate, the current flow through core 11 reverses direction once each revolution and; hence, when currents are flowing through the electrolyte, a voltage will be induced in winding 13 and this voltage will appear across output terminals 25 and 26 as a modulated signal with an envelope having the amplitude and frequency of the current flowing through the electrolyte and a phase representative of the direction of current flow through the electrolyte. Of course, if only D.C. current is present, the envelope will not include a frequency component. The carrier will have a frequency equal to the angular frequency of rotation of toroid 12 and encircled core 11 and an amplitude proportional to this angular frequency of rotation. Thus, it can be seen that the spinning of the toroid 12 and encircled core 11 not only makes the present invention suitable for measuring very low frequency currents flowing through an electrolyte but also increases the sensitivity of the measurements since the information bearing envelope rides on a relatively large amplitude carrier.

The aforementioned information is fed to measuring equipment which is coupled to output terminals 25 and 26. The measuring equipment may include any of the well known instruments which are suitable to provide readings of the aforementioned components of the information.

When the present invention is employed to measure the amplitude of ambient electric fields, toroid 12 and encircled core 11 are disposed in the ambient electric field. Again, core 11 enhances the current flow through the center of toroid 12 and the highly permeable magnetic material of which toroid 12 is composed enhances the magnetic field surrounding core 11 which is produced by current flow therethrough. However, if core 11 and toroid 12 were not spun, no signal would appear across output terminals 25 and 26 since the electric currents passing through core 11 would be negligible. However, core 11 will become electrically polarized in the presence of an electric field. When toroid 12 and encircled core 11 are spun, this polarization reverses itself once for each revolution thus causing a current flow through the center of toroid 12 and inducing a voltage in winding 13 which appears across output terminals 25 and 26. This output voltage is proportional to the amplitude of the electric field.

FIG. 2 illustrates the present invention as used to conduct investigations into the existence of a finite non-potential term in the earth's magnetic field. It will be noted that FIG. 2 differs from FIG. 1 only in that the center of toroid 12 is not plugged by a conductive core such as core 11 of FIG. 1.

In practice toroid 12 is manipulated until winding 13 contains a complete circular magnetic field. Then, when toroid 12 is spun, this magnetic field will be reversed once every revolution with respect to winding 13 and, hence, a voltage will be induced into winding 13 and will appear across output terminals 25 and 26. Such a voltage across terminals 25 and 26 will indicate the presence of a finite non-potential term in the earth's magnetic field.

It should now be obvious that the present invention provides a useful tool to measure the density, direction, and frequency of currents, including very small, low frequency currents, flowing through an electrolyte and to measure the amplitude of electric fields, including small amplitude ambient electric fields, and for conducting investigations into the nature of the earth's magnetic field. It should also be clear that the present invention provides unique methods for making the aforementioned measurements and for conducting the aforementioned investigations.

Obviously many modifications and variations of the present invention are possible in the light of the above teachings. It is therefore to be understood that within the scope of the appended claims the invention may be practiced otherwise than as specifically disclosed.

What is claimed and desired to be secured by Letters Patent of the United States is:

1. A spinning line integral magnetometer for measuring a current or an electric field comprising:
   a toroid composed of a highly permeable magnetic material;
   a multi-turn coil having first and second output leads toroidally wound on said toroid;
   means spinning said toroid at a fixed angular rate in the current or field to be measured; and
   means for measuring the signal on said output leads.

2. The spinning line integral magnetometer of claim 1 further including:
   a conductive core encircled by and mechanically coupled to said toroid.

3. The spinning line integral magnetometer of claim 1 wherein said means spinning said toroid includes:
   a motor;
   a rotatable shaft;
   said shaft being coupled to said motor whereby said motor may rotate said shaft; and
   a yoke secured to said toroid and spun by rotation of said shaft.

4. The spinning line integral magnetometer of claim 3 further including:
a conductive core encircled by and mechanically coupled to said toroid.

5. The spinning line integral magnetometer of claim 3 wherein said shaft is hollow and has two conductive rings insulated from one another and from said toroid, said output leads passing through said hollow shaft with said first output lead making contact with one of said rings and said second output lead making contact with the other of said rings.

6. The spinning line integral magnetometer of claim 5 further including:
a conductive core encircled by and mechanically coupled to said toroid.

7. The spinning line integral magnetometer of claim 5 wherein said yoke is coupled to opposed sides of said toroid and further including first and second sliding contacts conductively engaging said one and said other of said conductive rings respectively, and said measuring means coupled between said contacts.

8. The spinning line integral magnetometer of claim 7 further including:
a conductive core encircled by and mechanically coupled to said toroid.

9. The method of measuring the density, direction, and frequency of current flow through an electrolyte with a line integral magnetometer having a conductive core encircled by a highly permeable toroid which has a coil toroidally wound thereon with said coil being coupled to output terminals comprising the steps of:
placing said toroid in said electrolyte; and
spinning said toroid at a constant angular rate;
whereby the amplitude, phase, and frequency of the voltage appearing across said output terminals are respectively proportional to the density, direction, and frequency of said current flow.

10. The method of measuring the amplitude of an ambient electric field with a line integral magnetomer having a conductive core encircled by a highly permeable toroid which has a coil toroidally wound thereon with said coil being coupled to output terminals comprising the steps of:
placing said toroid in said field whereby said core is polarized by said field; and
spinning said toroid whereby said polarization reverses once every revolution causing current proportional to the amplitude of said field to flow through said core and a voltage proportional to the amplitude of said field to appear across said output terminals.

11. The method of detecting any finite non-potential term in the earth's magnetic field with a highly permeable toroid having a coil toroidally wound thereon with said coil being coupled to output terminals comprising the steps of:
placing said toroid in the earth's atmosphere;
orienting said toroid so that said coil contains a complete circular magnetic field; and
spinning said toroid to cause said field to reverse with respect to said coil once every revolution;
whereby any finite non-potential term in said field induces a voltage in said coil which voltage appears across said output terminals.

References Cited
UNITED STATES PATENTS 2,297,568   9/1942   Leonardon   324—47
2,832,046   4/1958   Rezek   324—29

RUDOLPH V. ROLINEC, *Primary Examiner.*

R. J. CORCORAN, *Assistant Examiner.*

U.S. Cl. X.R.

324—7, 8, 29, 30, 72, 117; 336—229